(12) United States Patent
Yan et al.

(10) Patent No.: US 11,601,724 B2
(45) Date of Patent: Mar. 7, 2023

(54) METHOD, APPARATUS, AND SYSTEM FOR DISPLAYING COMMENT INFORMATION

(71) Applicant: BEIJING DAJIA INTERNET INFORMATION TECHNOLOGY CO., LTD., Beijing (CN)

(72) Inventors: Yin Yan, Beijing (CN); Qiuge Yang, Beijing (CN); Jun Cheng, Beijing (CN); Yulong Shi, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/750,483

(22) Filed: May 23, 2022

(65) Prior Publication Data
US 2022/0286749 A1    Sep. 8, 2022

Related U.S. Application Data

(63) Continuation of application No. 17/102,680, filed on Nov. 24, 2020, now Pat. No. 11,375,282.

(30) Foreign Application Priority Data

Nov. 29, 2019   (CN) .......................... 201911205398.1

(51) Int. Cl.
H04N 21/4788 (2011.01)
H04N 21/45 (2011.01)
H04N 21/488 (2011.01)
G06F 16/2457 (2019.01)

(52) U.S. Cl.
CPC ... H04N 21/4788 (2013.01); G06F 16/24573 (2019.01); H04N 21/4532 (2013.01); H04N 21/4882 (2013.01)

(58) Field of Classification Search
CPC ........... H04N 21/4788; H04N 21/4532; H04N 21/4882; H04N 21/25891; H04N 21/47205; H04N 21/2743; H04N 21/47217; H04N 21/44204; H04N 21/25883; H04N 21/4753; H04N 21/431; H04N 21/488; G06F 16/24573
USPC ........................................................ 725/139
See application file for complete search history.

(56) References Cited

U.S. PATENT DOCUMENTS

2020/0356782 A1* 11/2020 Liu ..................... G06F 18/2431

FOREIGN PATENT DOCUMENTS

CN    109885770 A  *  6/2019
CN    110519617 A  *  11/2019

* cited by examiner

Primary Examiner — Cynthia M Fogg
(74) Attorney, Agent, or Firm — Timothy W. Menasco, Esq.; Harter Secrest & Emery LLP

(57) ABSTRACT

The present disclosure can provide a method, an apparatus and a system for displaying comment information, a client, and a server. The client can determine a comment copywriting tag of a user account first, and then in response to a comment releasing instruction from the user account, obtain target comment information corresponding to the comment copywriting tag from a comment database, and release the target comment information in a comment interface of the user account.

17 Claims, 7 Drawing Sheets

METHOD, APPARATUS, AND SYSTEM FOR DISPLAYING COMMENT INFORMATION

This application is a continuation application of U.S. application Ser. No. 17/102,680, which is based on and claims priority to Chinese Patent Application No. 201911205398.1, filed on Nov. 29, 2019, the disclosure of which is herein incorporated by reference in its entirety.

TECHNICAL FIELD

The present disclosure relates to a field of Internet technologies, and more particularly, to a method, an apparatus and a system for displaying comment information, a client, a server, and a computer readable storage medium.

BACKGROUND

With rapid development of information technologies, through the Internet, users may share information resources, publishers may release information resources such as short videos and audios, and content consumers could consume these contents, for example, watch the short videos, and play the audios.

Comments are an important way of interaction between the users, and providing users with more efficient comment functions is conducive to improving efficiency of sharing information resource among the users. In the related art, when the user needs to comment on contents such as short videos and audios, comment information needs to be re-entered each time, and thus efficiency of releasing the comment information is low.

SUMMARY

In a first aspect, a method for displaying comment information is provided. The method is applied to a client, and includes: determining a comment copywriting tag of a user account; in response to a comment releasing instruction from the user account, obtaining target comment information corresponding to the comment copywriting tag from a comment database; and releasing the target comment information in a comment interface of the user account.

In a second aspect, another method for displaying comment information is provided. The method is applied to a server, and includes: receiving a comment information obtaining request, in which the comment information obtaining request is generated by a client according to a comment releasing instruction from a user account; and in response to the comment information obtaining request, determining a comment copywriting tag of the user account, and obtaining target comment information corresponding to the comment copywriting tag from a comment database; and sending the target comment information to the client, so that the client releases the target comment information in a comment interface of the user account.

In a third aspect, a client including a processor and a memory is provided. The memory is stored thereon with a computer program. When the computer program is executed by the processor, the following acts are implemented: determining a comment copywriting tag of a user account; in response to a comment releasing instruction from the user account, obtaining target comment information corresponding to the comment copywriting tag from a comment database; and releasing the target comment information in a comment interface of the user account.

In a fourth aspect, a server including a processor and a memory is provided. The memory is stored thereon with a computer program. When the computer program is executed by the processor, the following acts are implemented: receiving a comment information obtaining request, in which the comment information obtaining request is generated by a client according to a comment releasing instruction from a user account; and in response to the comment information obtaining request, determining a comment copywriting tag of the user account, and obtaining a target comment information corresponding to the comment copywriting tag from a comment database; and sending the target comment information to the client, so that the client releases the target comment information in a comment interface of the user account.

In a fifth aspect, a system for displaying comment information is provided. The system includes the client and the server described above.

In a sixth aspect, a computer-readable storage medium having a computer program stored thereon is provided. When the computer program is executed by a processor, the following acts are implemented: determining a comment copywriting tag of a user account; in response to a comment releasing instruction from the user account, obtaining target comment information corresponding to the comment copywriting tag from a comment database; and releasing the target comment information in a comment interface of the user account.

In a seventh aspect, another computer-readable storage medium having a computer program stored thereon is provided. When the computer program is executed by the processor, the following acts are implemented: receiving a comment information obtaining request, in which the comment information obtaining request is generated by a client according to a comment releasing instruction from a user account; and in response to the comment information obtaining request, determining a comment copywriting tag of the user account, and obtaining target comment information corresponding to the comment copywriting tag from a comment database; and sending the target comment information to the client, so that the client releases the target comment information in a comment interface of the user account.

DETAILED DESCRIPTION

In order to make the purpose, technical solution, and advantages of this application clear, the following further describes this application in detail with reference to the accompanying drawings and embodiments. It should be understood that the specific embodiments described here are only used to explain the application, and not used to limit the application.

It should be noted that the term "first\second" involved in the embodiments of the present application only distinguishes similar objects, and does not represent a specific order for objects. Understandably, "first\second" may be interchanged in a specific order or sequence when permitted. It should be understood that the objects distinguished by "first\second" may be interchanged under appropriate circumstances, so that the embodiments of the present application described herein may be implemented in an order other than those illustrated or described herein.

Figure 1:
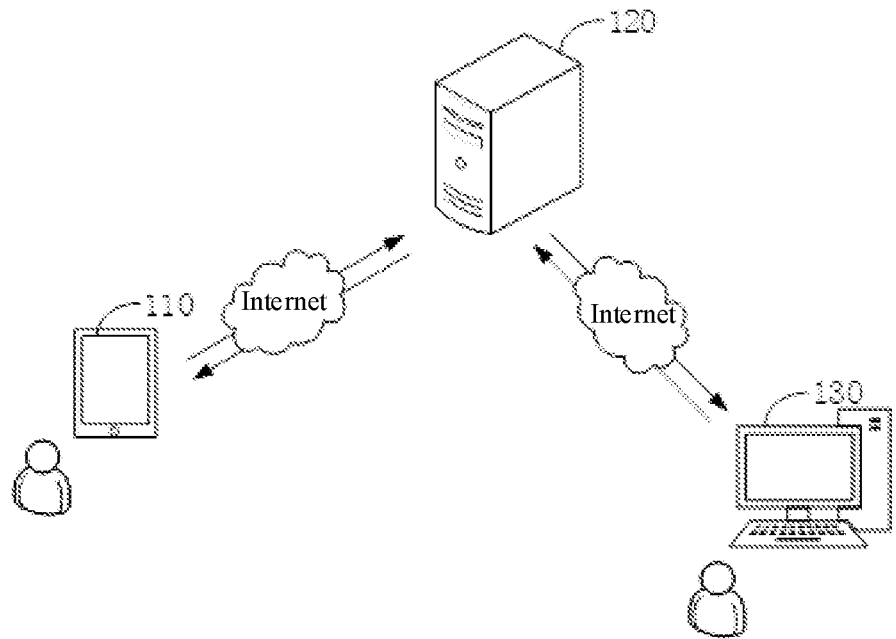
FIG. 1 shows an application scenario of a method for displaying comment information according to an embodiment.

The method for displaying comment information according to this application may be applied for the application scenario in FIG. 1. FIG. 1 shows an application scenario diagram of a method for displaying comment information according to an embodiment. The application scenario may include a first client 110, a server 120, and a second client 130. The server 120 may communicate with the first client 110 and the second client 130 respectively through a network. The second client 130 may be used as a content releasing end to release related content through the server 120 for sharing with other clients, and the first client 110 may obtain the content released by the second client 130 from the server 120 after establishing a network communication connection with the server 120, and the first client 110 may also comment on these content, for example, post comment information such as "amazing".

Figure 2:
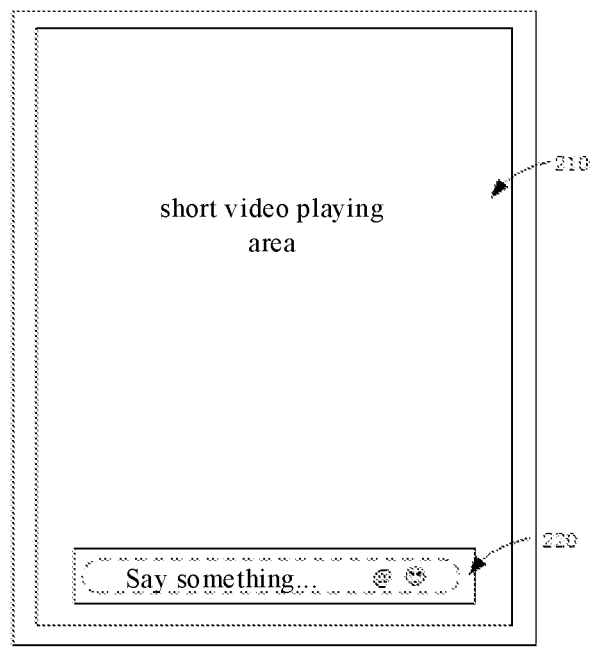
FIG. 2 is a diagram of a comment interface of a client according to an embodiment.

For example, if the content is a short video, the first client 110 may comment on the short video released by the second client 130 through the server 120. FIG. 2 is a diagram of a comment interface of a client according to an embodiment. As a client for playing the short video, the first client 110 may play the short video in a short video playing area 210 as shown in FIG. 2. The first client 110 may also display a comment box 220, and the user may enter relevant comment information in a "Say something" comment box in the comment box 220, to comment on the short video played on the first client 110. In this way, the comment information needs to be re-entered in the comment box each time, and the efficiency of releasing the comment information is low.

The method for displaying comment information according to embodiments of the present disclosure may be applied to solve the technical problem. In detail, the first client 110 may first determine a comment copywriting tag of a user account, and then may further obtain target comment information corresponding to the comment copywriting tag from a comment database in response to a comment posting instruction from the user account, and release the target comment information in a comment interface of the user account.

In some embodiments, the first client 110 and the second client 130 may include, but are not limited to, various personal computers, notebook computers, smart phones, tablet computers, and portable wearable devices. The server 120 may be implemented by an independent server or a server cluster composed of a plurality of servers.

Figure 3:
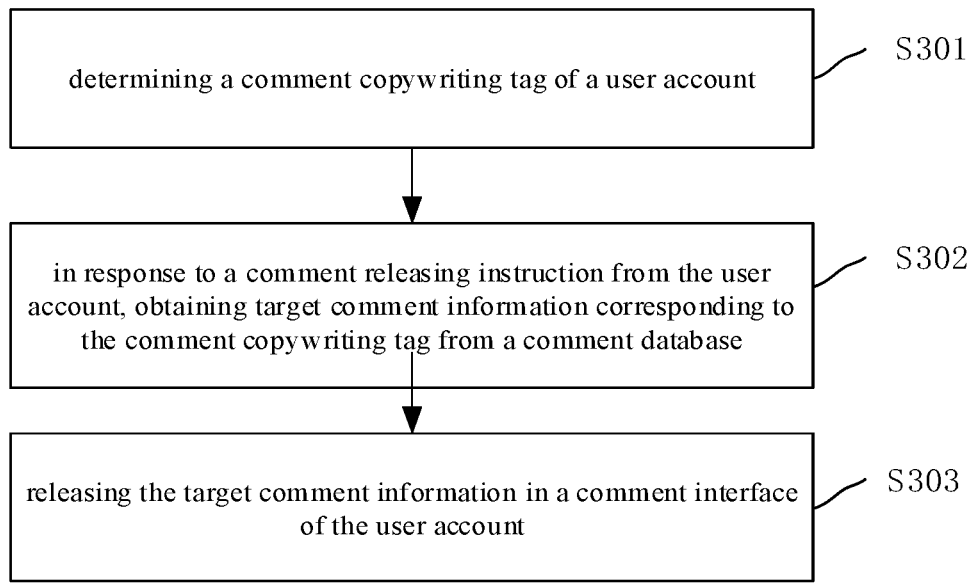
FIG. 3 is a flowchart of a method for displaying comment information according to an embodiment.

FIG. 3 is a flowchart of a method for displaying comment information according to an embodiment. The method is applicable for the first client 110 shown in FIG. 1. As illustrated in FIG. 3, the method for displaying comment information may include the following actions.

In S301, a comment copywriting tag of a user account is determined.

In some embodiments, the first client 110 may determine the comment copywriting tag of the user account. The user account refers to an account that logs in to the first client 110 and is used to comment on related content displayed on the first client 110. As illustrated in FIG. 1, when the first client 110 plays a short video sent by the server 120, the user may log in to the first client 110 with the user account, to comment on the short video displayed by the first client 110. The related content displayed on the first client 110 may include, but is not limited to, short videos, Q&A contents, long videos, and news contents.

In some embodiments, the current end may first be dedicated to the comment copywriting tag of the user account. The comment copywriting tags are used to identify different comment copywriting, and the comment copywriting tag of each comment copywriting may be set according to the specific content of the comment copywriting, the content type and style type of the comment copywriting, and other factors. For example, the comment copywriting tag of the comment copywriting that contains the word "hot" may be "hot". As another example, if the comment copywriting belongs to an ACGN style, the comment copywriting tag may be "AC GN". As another example, if the content type is parent-child comment copywriting, the comment copywriting tag may be "parent-child".

Different user accounts correspond to different comment copywriting tags, due to differences in the specific users' comment preferences and content preferences, different login locations, different login time, and different current consumption contents. For example, for a user account whose login location is Guangdong, the matching comment copywriting tag may be related to Guangdong. For the user account that frequently consumes funny videos, the matching comment copywriting tag may be related to funny videos. In some embodiments, after determining the comment copywriting tag of the user account, the comment copywriting tag may be further used to find matching comment copywriting information for the user account, thereby more accurately meeting the user's comment requirements for related content.

In S302, in response to a comment releasing instruction from the user account, target comment information corresponding to the comment copywriting tag is obtained from a comment database.

In some embodiments, after the comment copywriting tag is obtained, the target comment information corresponding to the comment copywriting tag is further obtained. In detail, the first client 110 may receive the comment releasing instruction from the user account, and then obtain the target comment information corresponding to the comment copywriting tag from the comment database. The comment database is pre-configured in the first client 110, and may store multiple pieces of comment information. Each piece of comment information may be preset with a plurality of comment copywriting tags, that is, each comment copywriting may be corresponding to a plurality of the comment copywriting tags. After the comment copywriting tag is obtained, the comment copywriting tag of each piece of comment information may be viewed, and the comment information corresponding to the comment copywriting tag of the user account is determined as the target comment information. It should be noted that the number of pieces of the target comment information may be one or more. If the number of pieces of comment information corresponding to the comment copywriting tag of the user account is found to be large, for example, more than 100, then a certain number, such as 10 pieces may be selected as the target comment information from these comment information according to requirements of an actual scenario.

In some embodiments, the comment database may be configured on the server 120, and the first client 110 may, after receiving the comment releasing instruction from the user account, send a comment information obtaining request to the server 120 in response to the comment releasing instruction, to trigger the server 120 to select the target comment information corresponding to the comment copywriting tag of the user account from the comment database and return the target comment information to the first client 110. In an actual scenario, the first client 110 may also directly send the comment copywriting tag of the user account to the server 120 after receiving the comment releasing instruction of the user account, so that the server 120 obtains the target comment information corresponding to the comment copywriting tag from the comment database and feedback the target comment information to the first client 110, thereby reducing the processing resource consumption of the client.

In S303, the target comment information is released in a comment interface of the user account.

The first client 110 may display a comment interface of the user account, and the comment interface may display a comment column for the user to comment on the related content in the comment column. In some embodiments, after obtaining the target comment information of the user account, the first client 110 may release the target comment information in the comment interface of the user account. In this way, the user may view the target comment information displayed in the comment interface displayed by the first client 110, and comment on the relevant content currently displayed by the first client 110 based on the target comment information, without manually inputting comment copywriting. The comment copywriting is strongly related to the current user account, so that it is convenient to select the desired target comment information and achieve the effect of commenting rapidly and conveniently.

Figure 4:
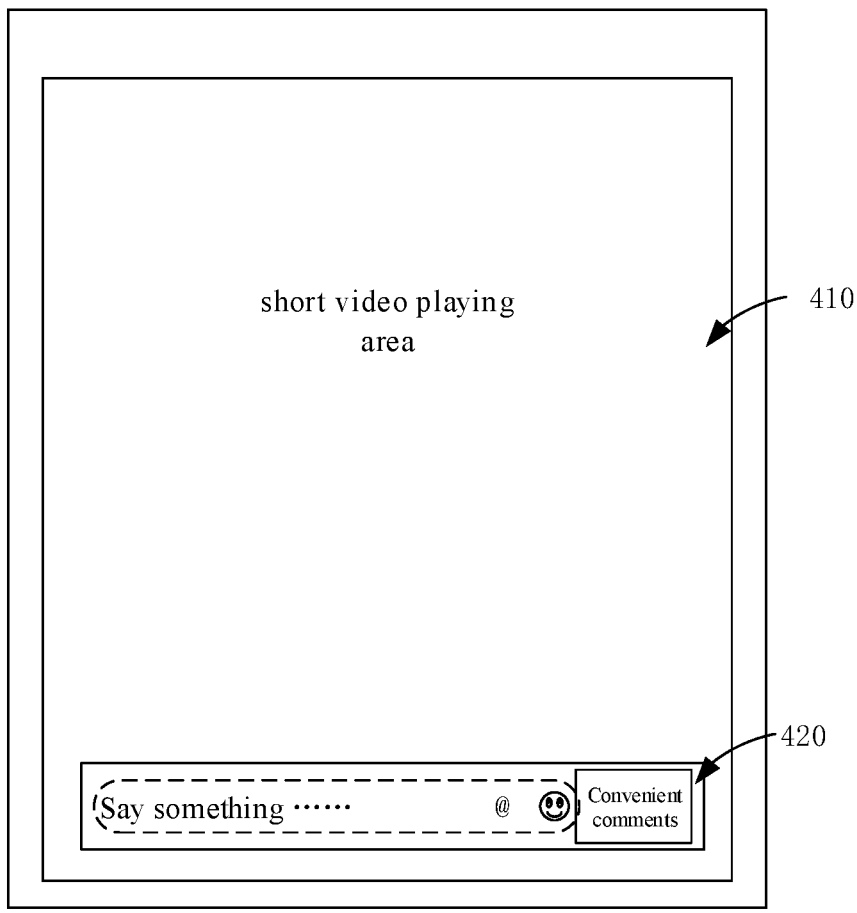
FIG. 4(a) is diagram of a comment interface of the client according to an embodiment.
FIG. 4(b) is a diagram of a display interface of comment information according to an embodiment.
Figure 4:
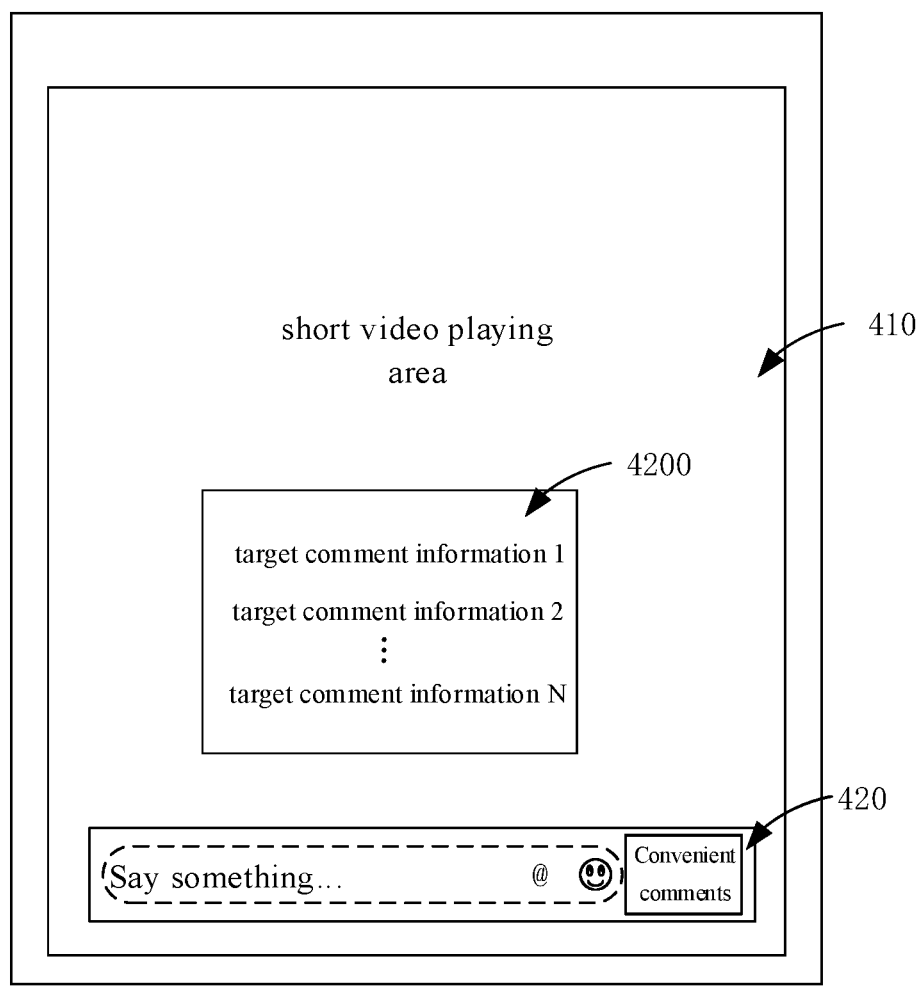

The following takes a short video as a target content (content to be commented) as an example for description, and illustrates the solution of embodiments of the present disclosure in combination with FIG. 4(a) and FIG. 4(b). FIG. 4(a) is a diagram of a comment interface of the client according to an embodiment. The first client 110 may play the short video in a short video play area 410, and may also display a comment box 420. The comment box 420 may include a convenient comment button. The user may trigger a comment releasing instruction by clicking the convenient comment button. The first client 110 determines the comment copywriting tag of the user account, receives the comment releasing instruction from the user account, and selects the target comment information corresponding to the comment copywriting tag from the comment database in response to the comment releasing instruction. FIG. 4(b) is a diagram of a display interface of comment information according to an embodiment. The first client 110 may display the target comment information 4200 in the comment interface after detecting that the convenient comment button is clicked by the user. There may be multiple pieces of target comment information, and each piece of target comment information may correspond to different comment copywriting. In this way, the required comment information may be quickly and conveniently selected from the comment information, thereby improving the comment efficiency.

The above method for displaying comment information first determines the comment copywriting tag of the user account, and then in response to the comment releasing instruction from the user account, obtains the target comment information corresponding to the comment copywriting tag from the comment database, and releases the obtained target comment information in the comment interface of the user account, so that the user may release the comment information without manually inputting the comment copywriting.

In some embodiments, in S301, determining the comment copywriting tag of the user account may include: obtaining preference information of the user account; and determining the comment copywriting tag of the user account according to the preference information.

In this embodiment, the first client 110 may obtain the preference information of the user account, and the preference information includes at least one of a content preference type or a comment preference type. The comment preference type may be determined by information such as comment contents frequently browsed by the user account, and types of the comment contents that are frequently browsed. For example, if the user account often thumbs up to and forwards comment contents belonging to a funny category, then the comment preference type of the user account may be the comments of the funny category. The content preference type may be determined by information such as contents frequently browsed by the user account, and types of the contents that are frequently browsed. For example, if the user account often views ACGN video contents, the content preference type of the user account may be the ACGN content.

The comment copywriting tag of the user account may be determined according to the preference information of the user account. For example, for a user account who likes funny comments and watching ACGN video contents, "funny" and "ACGN" may be set as the comment copywriting tags of the user account. In this embodiment, the comment copywriting tag of the user account is determined based on the preference information of the user account, which is conductive to more accurately obtain the comment copywriting conforming to the preference of the user account based on the comment and content consumption preference of the user account, so that the comment copywriting sent by the user account is more personalized.

In some embodiments, determining the preference information of the user account may be implemented by: obtaining user behavior data of the user account; and obtaining the preference information of the user account based on the user behavior data.

In this embodiment, the first client 110 may obtain the user behavior data of the user account, so as to analyze the user behavior data to obtain the preference information of the user account. The user behavior data includes at least one of comment-related behavior data of the user account for different comments and content-related behavior data of the user account for different contents. The comment-related behavior data includes at least one of duration of the comment-related behavior, thumb up data and sub-comment viewing data, and the content-related behavior data includes at least one of duration of the content-related behavior, thumb up data and comment viewing data.

In detail, the first client 110 may obtain the user behavior data of the user account from a backend, that is, the server 120, the user behavior data including the comment-related behavior data of the user account for different comments and the content-related behavior data of the user account for different contents. For example, the user account may watch and thumb up to different contents, or may view comments on the content, then the first client 110 may obtain content-related behavior data such as the user account's viewing duration for different contents, thumb up data, and comment viewing data. In addition to consuming contents, the user account may also consume comments. For example, the user account may view and thumb up to different comments, or may view sub-comments, and accordingly, the first client 110 may also obtain the comment-related behavior data such as the viewing durations of the user account for different comments, thumb up data, and sub-comment viewing data. Thus, the first client 110 may determine the content-related behavior data and the comment-related behavior data as the user behavior data of the user account, and obtain the preference information of the user account according to the user behavior data. For example, for a user account that frequently thumbs up to, forwards, or interacts with funny comments, it may be determined that the preference information of the user account includes various funny comment contents viewed by the user account. If the user account has watched food videos for a long time, or has forwarded or thumbed up to food short videos, it may be determined that the preference information of the user account may include various food videos that have been watched by the user account, and on the basis of this, it is possible to more accurately recommend funny comment copywriting or food comment copywriting for the user.

In some embodiments, determining the comment copywriting tag of the user account according to the preference information may include: determining the content preference type of the user account according to the preference information; and setting a comment copywriting tag matching the content preference type in a plurality of pre-stored comment copywriting tags as the comment copywriting tag of the user account.

In this embodiment, the first client 110 may obtain the preference information of the user account, and determine the content preference type of the user account according to the preference information of the user account. The content preference type may be determined by information such as contents frequently browsed by the user account, and types of the contents that are frequently browsed. For example, if the user account often views ACGN video contents, the content preference type of the user account may be the ACGN content. After obtaining the content preference type of the user account, the first client 110 may set a comment copywriting tag matching the content preference type in a plurality of pre-stored comment copywriting tags as the comment copywriting tag of the user account. The plurality of comment copywriting tags may be pre-stored in the server 120 or locally in the first client 110. On the basis of this, the first client 110 may select the comment copywriting tag matching the content preference type in the plurality of the comment copywriting tags. For example, for a user account whose content preference type is "food", the comment copywriting tag of "food" may be selected from the plurality of comment copywriting tags as the comment copywriting tag that matches the content preference type. Through the solution of this embodiment, it is possible to accurately deliver more personalized comment copywriting for the user account according to the content preference type of the user account.

In some embodiments, determining the comment copywriting tag of the user account according to the preference information may include: obtaining comment preference corpus of the user account according to the preference information; performing a word segmentation process on the comment preference corpus to obtain a comment preference word of the user account; and determining the comment copywriting tag of the user account according to the comment preference word.

In this embodiment, the first client 110 may obtain the preference information of the user account, for example, may perform corpus summary on the comment content preferred by the user account and titles of the preferred video content to generate comment preference corpus of the user account. Then, the first client 110 may perform word segmentation process on these comment preference corpus to obtain the comment preference word of the user account according to a result of the word segmentation processing. For example, if the user often views or browses the comment content that contains the word "hot", then "hot" may be used as the comment preference word of the user account, and the first client 110 may, after obtaining a plurality of comment preference words of the user account, directly use these comment preference words as the comment copywriting tags of the user account. In this way, for a user account that frequently browses the comment content related to the word "hot", the user is more likely to be issued comment copywriting such as "this video is a pre-ordered hot video" and "this video is soon to be hot video", which makes the first client 110 more accurately deliver personalized comment copywriting for the user account.

In some embodiments, in S301, determining the comment copywriting tag of the user account may include: obtaining a user profile of the user account; determining a content type of content to be commented; and in a plurality of pre-stored comment copywriting tags, setting a comment copywriting tag matching the content type and the user profile as the comment copywriting tag of the user account.

In this embodiment, the comment copywriting tag of the user account is determined based on the user profile of the user account in combination with the content type of the content to be commented, so that the comment copywriting issued for the user account based on the comment copywriting tag is more personalized and time-sensitive. In detail, the first client 110 may obtain the user profile of the user account, and the user profile includes at least one of age, identity, or geographic location. The user profile may be used to distinguish different user accounts. The first client 110 may generate a corresponding user profile for the user account according to the user's age, gender, current geographic location and other information of the user account. For example, for 25 years old male user who lives in a first-tier city, the user profile of the user account may be "young male' and "urban vibe".

The first client 110 may also determine the content type of the current content to be commented of the user account. The content to be commented may be a short video, and the content type of the short video may include ACGN and food, so that different content to be commented may be labeled with different tags, thereby providing different content copywriting to content with different tags. An ACGN short video may be labeled with a content type tag of "ACGN", and a food short video may be labeled with a content type tag of "food".

After obtaining the content type of the content to be commented and the user profile of the user account, the comment copywriting tag matching the user profile and the content type in the plurality of pre-stored comment copywriting tags may be set as the comment copywriting tag of the user account. The plurality of comment copywriting tags may be pre-stored in the server 120 or locally in the first client 110. Therefore, the first client 110 may select the comment copywriting tag matching the user profile and the content type from the plurality of comment copywriting tags. For example, when the user profile is "humorous" and the content type is "funny", the comment copywriting tag of "funny" in the comment copywriting tags is determined as the comment copywriting tag matching the user profile and the content type. Through the solution of this embodiment, it is possible to issue more personalized and time-sensitive comment copywriting according to the user profile of the user account and the type of content currently consumed by the user account.

In some embodiments, in S301, determining the comment copywriting tag of the user account may include: obtaining a current play progress of content to be commented; and in a plurality of pre-stored comment copywriting tags, setting a comment copywriting tag matching the current play progress as the comment copywriting tag of the user account.

In this embodiment, the first client 110 may determine the corresponding comment copywriting tag according to the current play progress of the content to be commented of the user account, and on basis of this, may deliver more time-sensitive comment copywriting. In detail, taking a short video as the content to be commented on as an example, when the short video is played on the first client 110, the current play progress may include, just starting to watch the short video, halfway through the short video, or finishing the short video.

The first client 110 may obtain the comment copywriting tag according to the current time point of watching the short video using the user account. For example, when just starting to watch the video, common comment copywriting, such as "wow, cannot miss the new videos", may be issued. The comment copywriting tag corresponding to these comment copywriting may be "just starting watching". When the user is watching the middle of the video, the common comment copywriting on the content, such as "doing great this time", may be issued, and the comment copywriting tag corresponding to these type of comment copywriting may be "playing". When finishing the video, author-related comments, such as "well done, old sport", may be issued, and the comment copywriting tag corresponding to this type of comment copywriting may be "finishing the video". Therefore, the first client 110 may select the comment copywriting tag matching the current play progress from the plurality of pre-stored comment copywriting tags according to the current play progress of the content to be commented and set the selected tag as the comment copywriting tag of the user account, so that the comment copywriting issued for the user account may change in real time according to the play progress of the content to be commented, and the timeliness is stronger.

In some embodiments, each comment copywriting in the comment database may be preset with a corresponding comment copywriting tag, and in S302, in response to the comment releasing instruction from the user account, obtaining the target comment information corresponding to the comment copywriting tag from the comment database may include: in response to the comment releasing instruction from the user account, obtaining a comment information database for the user account based on comment copywriting in the comment database with comment copywriting tags matching the comment copywriting tag of the user account; and obtaining the target comment information from the comment information database for the user account.

In this embodiment, the first client 110 may respond to the comment releasing instruction from the user account, and screen out comment copywriting that matches the comment copywriting tag of the user account from the comment database. A plurality of comment copywriting may be screened out from the comment database, and these comment copywriting may be integrated together to form the comment information database for the user account. Since the comment copywriting in the comment information database for the user account is strongly associated with the user account, the first client 110 may obtain one or more comment copywriting from the comment information database for the user account as target comment information, so that the obtained target comment information is also associated with the user account.

In some embodiments, obtaining the target comment information from the comment information database for the user account may further include: obtaining comment information from the comment information database for the user account as a comment copywriting template; obtaining a target nickname identifier; and combining the target nickname identifier with the comment copywriting template to obtain the target comment information.

In this embodiment, the first client 110 may obtain one or more comment information from the comment information database for the user account as the comment copywriting template, and then further combine the comment copywriting template with the target nickname identifier to obtain the target comment information. The target nickname identifier may include at least one of the nickname identifier of the user account and the nickname identifier of the content releasing account, in which the content releasing account refers to an account releasing the content to be commented. In detail, for a user account whose nickname identifier is "cute bunny", the nickname identifier may be combined with the comment copywriting template of "I, . . . , love watching your video most" to generate a comment copywriting "I, cute bunny, love watching your video most" as the target comment information. For example, for a content releasing account with a nickname identifier as "Daikin", the nickname identifier may be combined with the comment copywriting template of " . . . looks really beautiful today" to generate a comment copywriting "Daikin looks really beautiful today" as the target comment information.

In some embodiments, obtaining the target comment information from the comment information database for the user account may include: randomly selecting comment information from the comment information database for the user account to obtain the target comment information.

In this embodiment, after receiving the comment releasing instruction from the user account, the first client 110 may randomly select a plurality of comment information from the comment information database for the user account as the target comment information. The method of randomly selecting comment copywriting from the comment information database can make the selection of target comment information more flexible and personalized.

In some embodiments, it is also possible to use a combination of random selection and de-duplication to further optimize the selection of target comment information. In detail, randomly selecting the comment information from the comment information database for the user account to obtain the target comment information may include: randomly selecting a first set of comment information from the comment information database of the user account as the target comment information; and if the comment releasing instruction is received from the user account again, randomly selecting a second set of comment information from the comment information database as the target comment information, in which the second set of comment information includes comment information different from the comment information of the first set of comment information.

Figure 5:
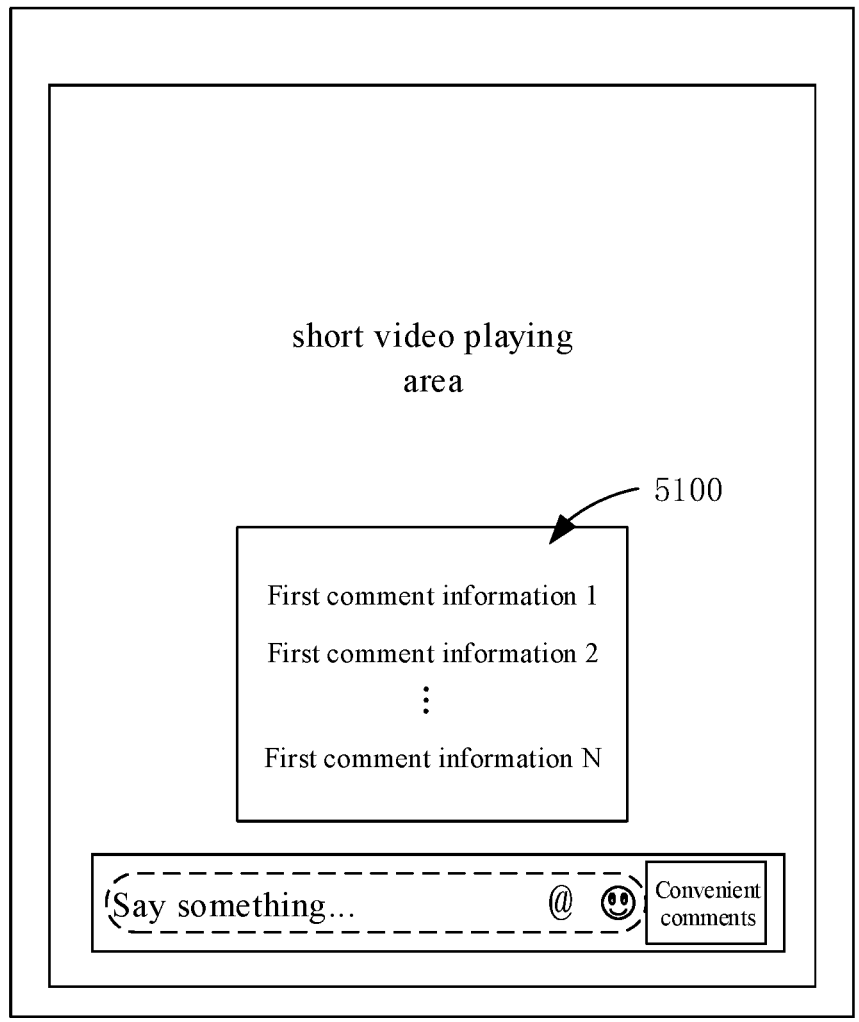
FIG. 5(a) is a diagram of a display interface of comment information according to an embodiment.
FIG. 5(b) is a diagram of a display interface of comment information according to an embodiment.
Figure 5:
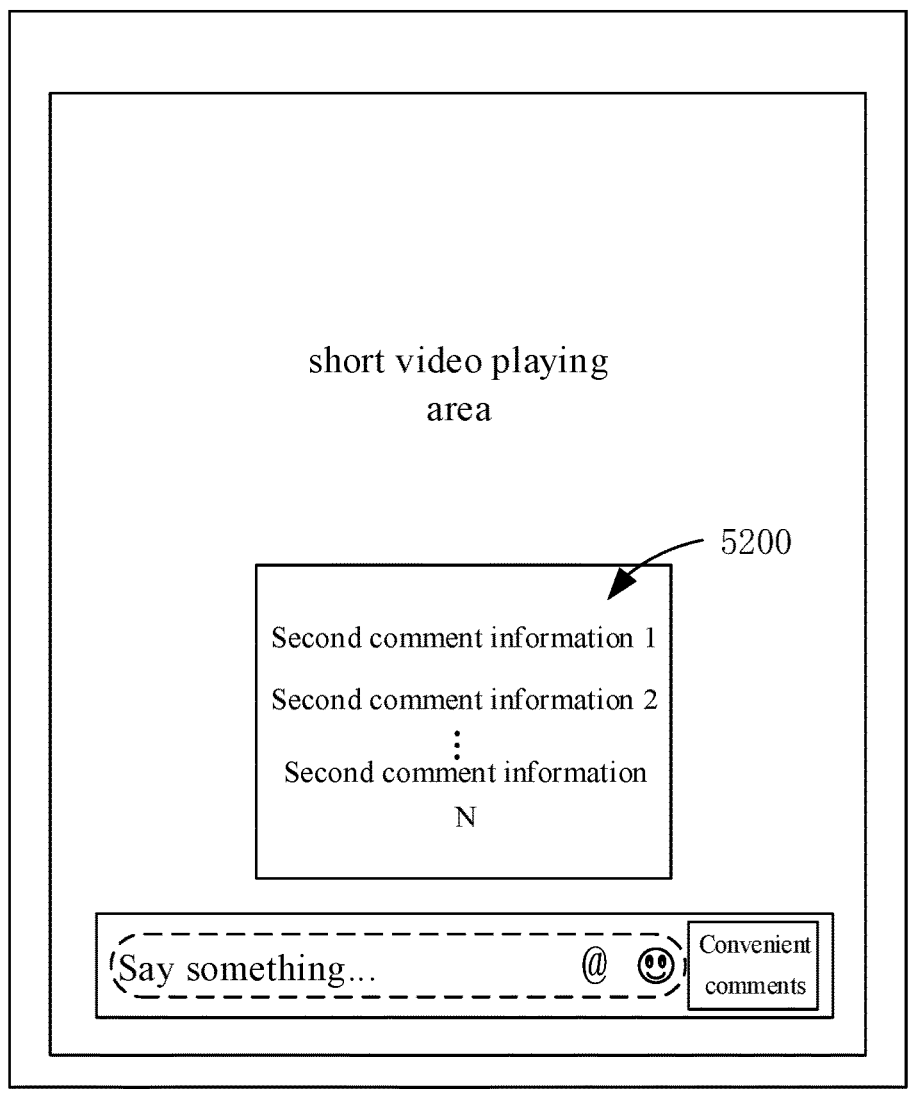

In this embodiment, the user may be provided with different target comment information when the target comment information currently displayed does not meet the needs of the user. With reference to FIGS. 5(a) and 5(b), FIG. 5(a) is a diagram of a display interface of comment information according to an embodiment. FIG. 5(a) shows that after the user clicks the convenient comment button to trigger the comment releasing instruction, the first client 110 randomly selects a first set of comment information 5100 from the comment information database and displays the first set of comment information 5100 in the comment interface of the user account. The first set of comment information 5100 may include a plurality of first comment information. At this time, if the user is not satisfied with the first set of comment information 5100, the convenient comment button may be clicked again. As illustrated in FIG. 5(b), the first client 110 receives the comment releasing instruction from the user account again, and selects a second set of comment information 5200 randomly from the comment information database. The second set of comment information 5200 is different from the first set of comment information 5100, and the second set of comment information 5200 may include a plurality of second comment information, in which the second comment information is different from the first comment information.

With the solution according to this embodiment, if the user is not satisfied with the currently displayed comment copywriting, the user could continuously click the convenient comment button to continuously generate new comment copywriting, thereby more conveniently selecting personalized comment copywriting. In the actual scenario, different copywriting identifies may be set for different comment copywriting, and through random selection and de-duplication, it may be ensured that the comment copywriting that appears each time is different from the last comment copywriting. For example, the copywriting identifier of the last comment copywriting is recorded, at this time, when the copywriting identifier of the randomly selected comment copywriting is the same as the copywriting identifier of the last comment copywriting, comment copywriting is selected again randomly until the copywriting identifier of the randomly selected comment copywriting is different from the copywriting identifier of the last comment copywriting.

Figure 6:
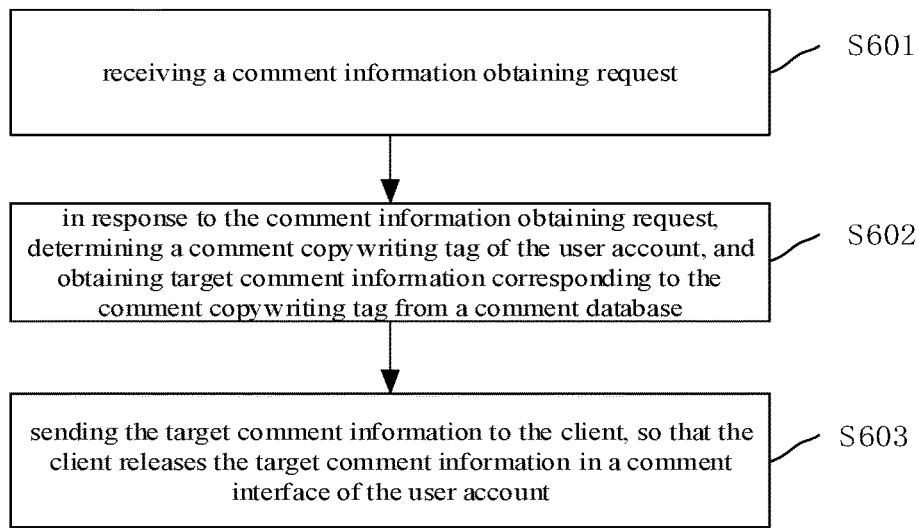
FIG. 6 is a flowchart of a method for displaying comment information according to another embodiment.

In some embodiments, a method for displaying comment information is provided. FIG. 6 is a flowchart of a method for displaying comment information according to another embodiment. The method is applied to the server 120 as shown in FIG. 1 for illustration. As illustrated in FIG. 6, the method may include the following actions.

In S601, a comment information obtaining request is received, in which the comment information obtaining request is generated by a client according to a comment releasing instruction from a user account.

In S602, in response to the comment information obtaining request, a comment copywriting tag of the user account is determined, and target comment information corresponding to the comment copywriting tag is obtained from a comment database.

In S603, the target comment information is sent to the client, so that the client releases the target comment information in a comment interface of the user account.

In some embodiments, the server 120 may receive the comment information obtaining request sent by the first client 110. The comment information obtaining request may be generated and sent to the server 120 by the first client 110 after receiving the comment releasing instruction from the user account. The server 120 may respond to the comment information obtaining request by first determining the comment copywriting tag of the user account, and then obtain the target comment information corresponding to the comment copywriting tag from the pre-stored comment database, and feedback the target comment information to the first client 110 to enable the first client 110 to release the target comment information in the comment interface of the user account after receiving the target comment information.

In the above method for displaying comment information, the server receives the comment information obtaining request sent by the client, and further selects the corresponding target comment information from the comment database according to the comment copywriting tag of the user account and feedback the target comment information to the client, so that the client may release the acquired target comment information in the comment interface of the user account. In this way, the user may release the comment information without manually inputting the comment copywriting, thereby improving the efficiency of releasing the comment information.

In some embodiments, in S601, determining the comment copywriting tag of the user account may include the followings.

The server 120 obtains preference information of the user account, in which the preference information includes at least one of a content preference type and a comment preference type. The server 120 determines the comment copywriting tag of the user account according to the preference information.

In some embodiments, the server 120 may obtain the preference information of the user account by the following acts.

The server 120 obtains user behavior data of the user account. The user behavior data includes at least one of comment-related behavior data of the user account for different comments and content-related behavior data of the user account for different contents, the comment-related behavior data includes at least one of duration of the comment-related behavior, thumb up data and sub-comment viewing data, and the content-related behavior data includes at least one of duration of the content-related behavior, thumb up data and comment viewing data. The server 120 obtains the preference information of the user account based on the user behavior data.

In some embodiments, the server 120 may determine the comment copywriting tag of the user account by the following acts.

The server 120 determines the content preference type of the user account according to the preference information. The server 120 sets a comment copywriting tag matching the content preference type in a plurality of pre-stored comment copywriting tags as the comment copywriting tag of the user account.

In some embodiments, the server 120 may determine the comment copywriting tag of the user account according to the preference information by the following acts.

The server 120 obtains comment preference corpus of the user account according to the preference information of the user account. The server 120 performs a word segmentation process on the comment preference corpus to obtain a comment preference word of the user account. The server 120 determines the comment copywriting tag of the user account according to the comment preference word.

Figure 7:
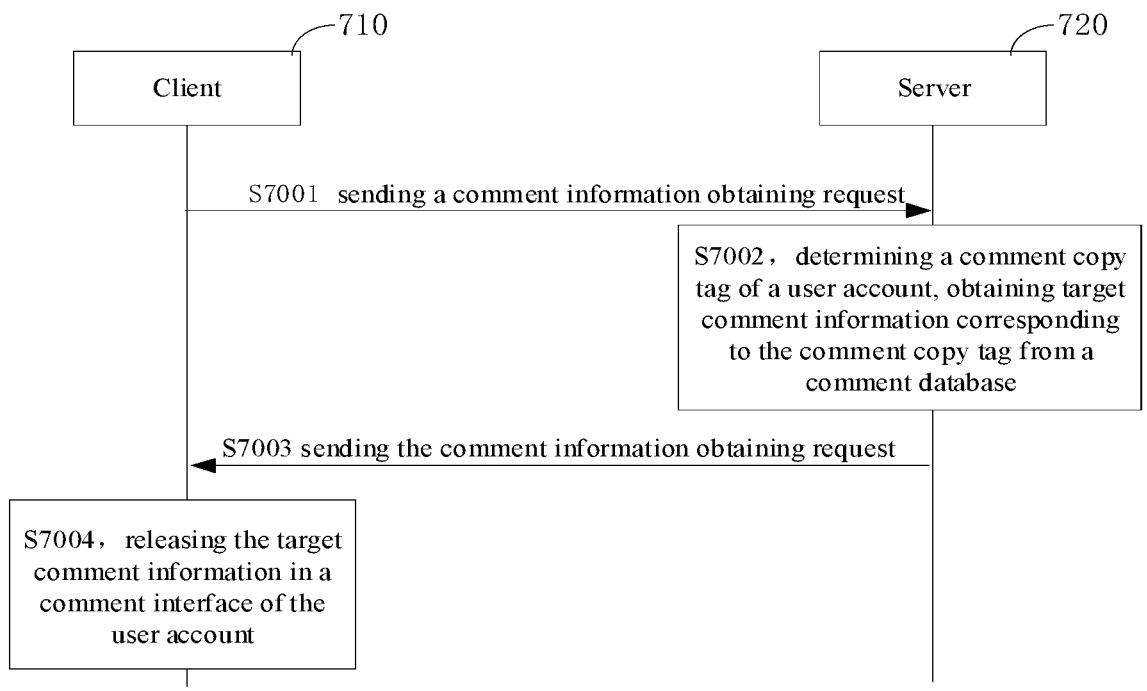
FIG. 7 is a signaling diagram of a method for displaying comment information according to an embodiment.

In some embodiments, a method for displaying comment information is provided, which may be implemented by a client 710 and a server 720. As illustrated in FIG. 7, which is a signaling diagram of a method for displaying comment information according to an embodiment, the method may include the following actions.

In S7001, the client 710 sends a comment information obtaining request to the server 720.

In S7002, the server 720 determines a comment copywriting tag of the user account, and obtains target comment information corresponding to the comment copywriting tag from a comment database, in response to the comment information obtaining request.

In S7003, the server 720 sends the target comment information to the client 710.

In S7004, the client 710 releases the target comment information in a comment interface of the user account.

In the above method for displaying comment information, the client sends the comment information obtaining request to the server, and the server further selects the corresponding target comment information from the comment database according to the comment copywriting tag of the user account and feedback the target comment information to the client, so that the client releases the obtained target comment information in the comment interface of the user account. In this way, the user may release the comment information without manually inputting the comment copywriting.

Figure 8:
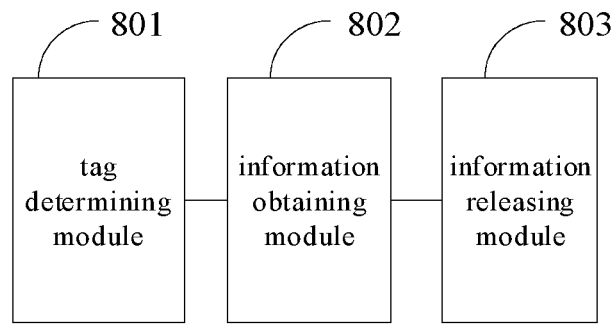
FIG. 8 is a block diagram of an apparatus for displaying comment information according to an embodiment.

As illustrated in FIG. 8, which is a block diagram of an apparatus for displaying comment information according to an embodiment, the apparatus may include a tag determining module 801, an information obtaining module 802 and an information releasing module 803.

The tag determining module 801 is configured to determine a comment copywriting tag of a user account.

The information obtaining module 802 is configured to, in response to a comment releasing instruction from the user account, obtain target comment information corresponding to the comment copywriting tag from a comment database.

The information releasing module 803 is configured to release the target comment information in a comment interface of the user account.

In some embodiments, the tag determining module 801 is configured to: obtain preference information of the user account, in which the preference information includes at least one of a content preference type and a comment preference type; and determine the comment copywriting tag of the user account according to the preference information.

In some embodiments, the tag determining module 801 is configured to: obtain user behavior data of the user account, in which the user behavior data includes at least one of comment-related behavior data of the user account for different comments and content-related behavior data of the user account for different contents, the comment-related behavior data includes at least one of duration of the comment-related behavior, thumb up data and sub-comment viewing data, and the content-related behavior data includes at least one of duration of the content-related behavior, thumb up data and comment viewing data; and obtain the preference information of the user account based on the user behavior data.

In some embodiments, the tag determining module 801 is configured to: determine the content preference type of the user account according to the preference information; and set a comment copywriting tag matching the content preference type in a plurality of pre-stored comment copywriting tags as the comment copywriting tag of the user account.

In some embodiments, the tag determining module 801 is configured to: obtain comment preference corpus of the user account according to the preference information; perform a word segmentation process on the comment preference corpus to obtain a comment preference word of the user account; and determine the comment copywriting tag of the user account according to the comment preference word.

In some embodiments, the tag determining module 801 is further configured to: obtain a user profile of the user account, in which the user profile includes at least one of an age, an identity and a geographic location; determine a content type of content to be commented; and set a comment copywriting tag matching the content type and the user profile in a plurality of pre-stored comment copywriting tags as the comment copywriting tag of the user account.

In some embodiments, the tag determining module 801 is configured to: obtain a current play progress of content to be commented; and set a comment copywriting tag matching the current play progress in a plurality of pre-stored comment copywriting tags as the comment copywriting tag of the user account.

In some embodiments, each comment copywriting in the comment database is preset with a corresponding comment copywriting tag, and the information obtaining module 802 is further configured to: in response to the comment releasing instruction from the user account, obtain a comment information database for the user account based on comment copywriting in the comment database with comment copywriting tags matching the comment copywriting tag of the user account; and obtain the target comment information from the comment information database for the user account.

In some embodiments, the information obtaining module 802 is further configured to: obtain comment information from the comment information database for the user account as a comment copywriting template; obtain a target nickname identifier, in which the target nickname identifier includes a nickname identifier of the user account and/or a nickname identifier of a content releasing account, and the content releasing account is an account releasing content to be commented; and combine the target nickname identifier with the comment copywriting template to obtain the target comment information.

In some embodiments, the information obtaining module 802 is further configured to: randomly select comment information from the comment information database for the user account to obtain the target comment information.

In some embodiments, the information obtaining module 802 is further configured to: randomly select a first set of comment information from the comment information database for the user account as the target comment information; and if the comment releasing instruction is received from the user account again, randomly select a second set of comment information from the comment information database as the target comment information, in which the second set of comment information includes comment information different from the comment information of the first set of comment information.

In some embodiments, the information obtaining module 802 is further configured to: in response to the comment releasing instruction from the user account, send a comment information obtaining request to a server to trigger selection and return of the target comment information corresponding to the comment copywriting tag from the comment database by the server.

Figure 9:
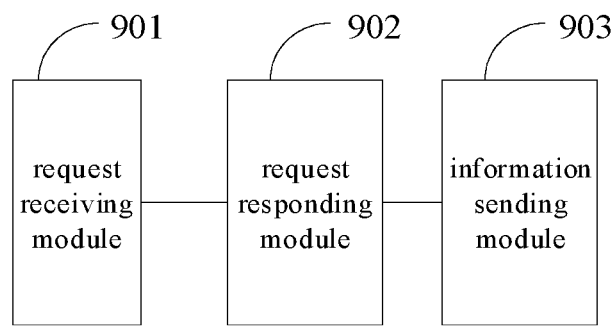
FIG. 9 is a block diagram of an apparatus for displaying comment information according to another embodiment.

In some embodiments, an apparatus for displaying comment information is provided. As illustrated in FIG. 9, which is a block diagram of an apparatus for displaying comment information according to another embodiment, the apparatus may include a request receiving module 901, a request responding module 902, and an information sending module 903.

The request receiving module 901 is configured to receive a comment information obtaining request, in which the comment information obtaining request is generated by a client according to a comment releasing instruction from a user account.

The request responding module 902 is configured to, in response to the comment information obtaining request, determine a comment copywriting tag of the user account, and obtain target comment information corresponding to the comment copywriting tag from a comment database.

The information sending module 903 is configured to send the target comment information to the client, so that the client releases the target comment information in a comment interface of the user account.

In some embodiments, the request responding module 902 is configured to: obtain preference information of the user account, in which the preference information includes at least one of a content preference type and a comment preference type; and determine the comment copywriting tag of the user account according to the preference information.

In some embodiments, the request responding module 902 is configured to: obtain user behavior data of the user account, in which the user behavior data includes at least one of comment-related behavior data of the user account for different comments and content-related behavior data of the user account for different contents, the comment-related behavior data includes at least one of duration of the comment-related behavior, thumb up data and sub-comment viewing data, and the content-related behavior data includes at least one of duration of the content-related behavior, thumb up data and comment viewing data; and obtain the preference information of the user account based on the user behavior data.

In some embodiments, the request responding module 902 is configured to: determine the content preference type of the user account according to the preference information; and set a comment copywriting tag matching the content preference type in a plurality of pre-stored comment copywriting tags as the comment copywriting tag of the user account.

In some embodiments, the request responding module 902 is configured to: obtain comment preference corpus of the user account according to the preference information; perform a word segmentation process on the comment preference corpus to obtain a comment preference word of the user account; and determine the comment copywriting tag of the user account according to the comment preference word.

The apparatus for displaying comment information according to this disclosure corresponds to the method for displaying comment information according to this disclosure. With respect to the specific limitation of the apparatus for displaying comment information, reference may be made to the above limitation on the method for displaying comment information. The technical features and beneficial effects described in the above embodiments are all applicable for the embodiments of the apparatus for displaying comment information, which is not repeated here.

Figure 10:
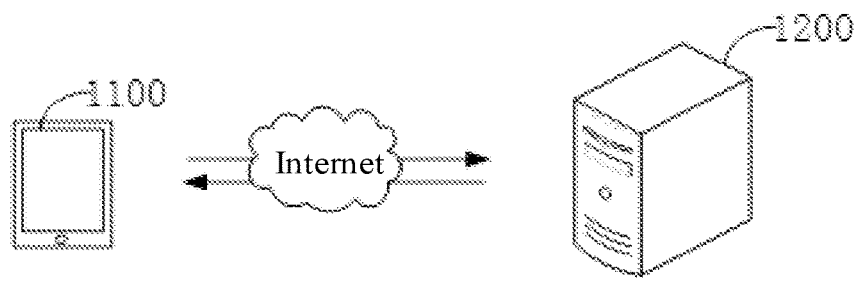
FIG. 10 is a block diagram of a system for displaying comment information according to an embodiment.

In some embodiments, a system for displaying comment information is provided. As illustrated in FIG. 10, which is a block diagram of a system for displaying comment information according to an embodiment, the system may include a client 1100 and a server 1200.

The client 1100 and the server 1200 are described below with reference to FIGS. 11 and 12.

Figure 11:
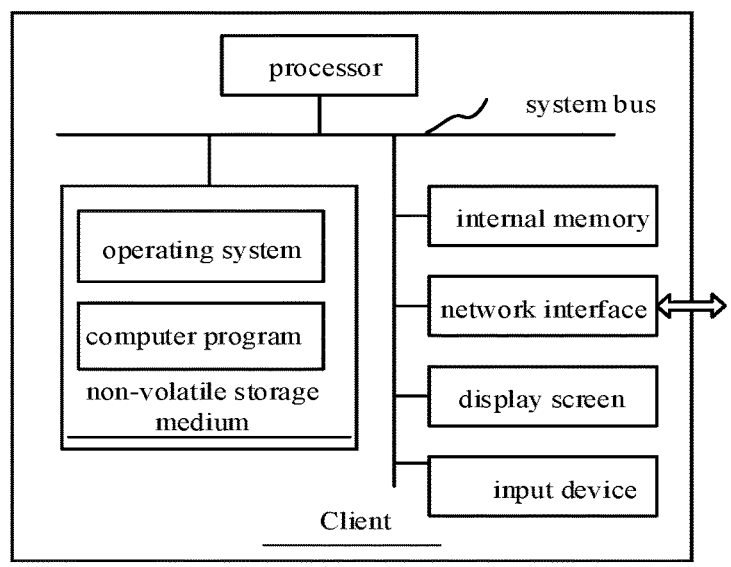
FIG. 11 is a diagram of an internal structure of a client according to an embodiment.

As illustrated in FIG. 11, which is a diagram of an internal structure of a client according to an embodiment, the client includes a processor, a memory, a network interface, a display screen and an input device connected through a system bus. The processor of the client is configured to provide computing and control capabilities. The memory of the client includes a non-volatile storage medium and an internal memory. The non-volatile storage medium is stored with an operating system and computer programs. The internal memory provides an environment for operation of the operating system and computer programs in the non-volatile storage medium. The network interface of the client is configured to communicate with an external device through a network connection. The method for displaying comment information is implemented when the computer program is executed by the processor. The display screen of the client may be a liquid crystal display or an electronic ink display. The input device of the client may be a touch layer covered on the display, or a button, trackball or touchpad set on a housing of the client, or an external keyboard, touchpad, or mouse.

Figure 12:
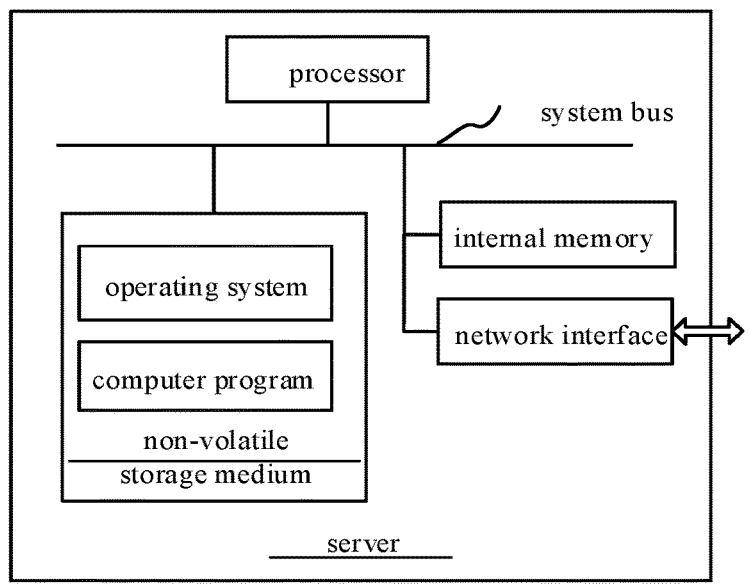
FIG. 12 is a diagram of an internal structure of a server according to another embodiment.

As illustrated in FIG. 12, which is a diagram of an internal structure of a server according to another embodiment, the server may include a processor, a memory, a network interface, and a database connected through a system bus. The processor of the server is configured to provide computing and control capabilities. The memory of the server includes a non-volatile storage medium and an internal memory. The non-volatile storage medium is stored with an operating system and computer programs. The internal memory provides an environment for operation of the operating system and computer programs in the non-volatile storage medium. The network interface of the server is configured to communicate with an external device through a network connection. The method for displaying comment information is implemented when the computer program is executed by the processor.

For those skilled in the art, it is understood that the structures shown in FIG. 11 and FIG. 12 are only block diagrams of portions of the structure related to the solution of the present disclosure, and do not constitute a limitation on the client and server to which the solution of the present disclosure is applied. The specific client and server may include more or fewer components than shown in the figure, or combine certain components, or have different component arrangements.

In some embodiments, a client is provided. The client includes a processor and a memory. The memory is stored with a computer program. When the computer program is executed by the processor, following acts are implemented:

determining a comment copywriting tag of a user account; in response to a comment releasing instruction from the user account, obtaining target comment information corresponding to the comment copywriting tag from a comment database; and releasing the target comment information in a comment interface of the user account.

In some embodiments, when the computer program is executed by the processor, following acts are further implemented: obtaining preference information of the user account, in which the preference information includes at least one of a content preference type and a comment preference type; and determining the comment copywriting tag of the user account according to the preference information.

In some embodiments, when the computer program is executed by the processor, the following acts are further implemented: obtaining user behavior data of the user account, in which the user behavior data includes at least one of comment-related behavior data of the user account for different comments and content-related behavior data of the user account for different contents, the comment-related behavior data includes at least one of duration of the comment-related behavior, thumb up data and sub-comment viewing data, and the content-related behavior data includes at least one of duration of the content-related behavior, thumb up data and comment viewing data; and obtaining the preference information of the user account based on the user behavior data.

In some embodiments, when the computer program is executed by the processor, the following acts are further implemented: determining the content preference type of the user account according to the preference information; and in a plurality of pre-stored comment copywriting tags, setting a comment copywriting tag matching the content preference type as the comment copywriting tag of the user account.

In some embodiments, when the computer program is executed by the processor, the following acts are implemented: obtaining comment preference corpus of the user account according to the preference information; performing a word segmentation process on the comment preference corpus to obtain a comment preference word of the user account; and determining the comment copywriting tag of the user account according to the comment preference word.

In some embodiments, when the computer program is executed by the processor, the following acts are implemented: obtaining a user profile of the user account, in which the user profile includes at least one of an age, an identity and a geographic location; determining a content type of content to be commented; and in a plurality of pre-stored comment copywriting tags, setting a comment copywriting tag matching the content type and the user profile as the comment copywriting tag of the user account.

In some embodiments, when the computer program is executed by the processor, the following acts are implemented: obtaining a current play progress of content to be commented; and in a plurality of pre-stored comment copywriting tags, setting a comment copywriting tag matching the current play progress as the comment copywriting tag of the user account.

In some embodiments, when the computer program is executed by the processor, the following acts are further implemented: in response to the comment releasing instruction from the user account, obtaining a comment information database for the user account based on comment copywriting in the comment database whose comment copywriting tags match the comment copywriting tag of the user account; and obtaining the target comment information from the comment information database for the user account.

In some embodiments, when the computer program is executed by the processor, the following acts are further implemented: obtaining comment information from the comment information database for the user account as a comment copywriting template; obtaining a target nickname identifier, in which the target nickname identifier comprises a nickname identifier of the user account and/or a nickname identifier of a content releasing account, and the content releasing account is an account releasing content to be commented; and combining the target nickname identifier with the comment copywriting template to obtain the target comment information.

In some embodiments, when the computer program is executed by the processor, the following acts are implemented: randomly selecting comment information from the comment information database for the user account to obtain the target comment information.

In some embodiments, when the computer program is executed by the processor, the following acts are implemented: randomly selecting a first set of comment information from the comment information database of the user account as the target comment information; and if the comment releasing instruction is received from the user account again, randomly selecting a second set of comment information from the comment information database as the target comment information, in which the second set of comment information includes comment information different from the comment information of the first set of comment information.

In some embodiments, when the computer program is executed by the processor, the following acts are implemented: in response to the comment releasing instruction from the user account, sending a comment information obtaining request to a server to trigger selection and return of the target comment information corresponding to the comment copywriting tag from the comment database by the server.

In some embodiments, a server is provided. The server includes a processor and a memory. The memory is stored with a computer program. When the computer program is executed by the processor, the following acts are implemented: receiving a comment information obtaining request, in which the comment information obtaining request is generated by a client according to a comment releasing instruction from a user account; and in response to the comment information obtaining request, determining a comment copywriting tag of the user account, and obtaining target comment information corresponding to the comment copywriting tag from a comment database; and sending the target comment information to the client, so that the client releases the target comment information in a comment interface of the user account.

In some embodiments, when the computer program is executed by the processor, the following acts are further implemented: obtaining user behavior data of the user account, in which the user behavior data includes at least one of comment-related behavior data of the user account for different comments and content-related behavior data of the user account for different contents, the comment-related behavior data includes at least one of duration of the comment-related behavior, thumb up data and sub-comment viewing data, and the content-related behavior data includes at least one of duration of the content-related behavior, thumb up data and comment viewing data; and obtaining the preference information of the user account based on the user behavior data.

In some embodiments, when the computer program is executed by the processor, the following acts are further implemented: determining the content preference type of the user account according to the preference information; and in a plurality of pre-stored comment copywriting tags, setting a comment copywriting tag matching the content preference type as the comment copywriting tag of the user account.

In some embodiments, when the computer program is executed by the processor, the following acts are further implemented: obtaining comment preference corpus of the user account according to the preference information; performing a word segmentation process on the comment preference corpus to obtain a comment preference word of the user account; and determining the comment copywriting tag of the user account according to the comment preference word.

For those skilled in the art, it is understandable that all or part of the process in the method for displaying comment information as described in any of the previous embodiments is completed by instructing relevant hardware through a computer program, and the computer program is stored in a non-volatile computer readable storage medium, the computer program may include the processes of the above-mentioned method embodiments when being executed. Any reference to memory, storage, database, or other media used in this application may include non-volatile and/or volatile memory. Suitable non-volatile memory may include read-only memory (ROM), programmable ROM (PROM), electrically programmable ROM (EPROM), electrically erasable programmable ROM (EEPROM), or flash memory. Volatile memory can include random access memory (RAM), which is used as external cache memory. By way of illustration and not limitation, RAM is available in various forms, such as static RAM (SRAM), dynamic RAM (DRAM), synchronous DRAM (SDRAM), dual data rate SDRAM (DDR SDRAM), enhanced SDRAM (ESDRAM), synchronous Link (Synchlink) DRAM (SLDRAM), memory bus (Rambus) direct RAM (RDRAM), direct memory bus dynamic RAM (DRDRAM), and memory bus dynamic RAM (RDRAM).

In some embodiments, a computer-readable storage medium having a computer program stored thereon is provided. When the computer program is executed by the processor, the following acts are implemented: determining a comment copywriting tag of a user account; in response to a comment releasing instruction from the user account, obtaining target comment information corresponding to the comment copywriting tag from a comment database; and releasing the target comment information in a comment interface of the user account.

In some embodiments, when the computer program is executed by the processor, the following acts are further implemented: obtaining preference information of the user account, in which the preference information includes at least one of a content preference type and a comment preference type; and determining the comment copywriting tag of the user account according to the preference information.

In some embodiments, when the computer program is executed by the processor, the following acts are implemented: obtaining user behavior data of the user account, in which the user behavior data includes at least one of comment-related behavior data of the user account for different comments and content-related behavior data of the user account for different contents, the comment-related behavior data includes at least one of duration of the comment-related behavior, thumb up data and sub-comment viewing data, and the content-related behavior data includes at least one of duration of the content-related behavior, thumb up data and comment viewing data; and obtaining the preference information of the user account based on the user behavior data.

In some embodiments, when the computer program is executed by the processor, the following acts are further implemented: determining the content preference type of the user account according to the preference information; and in a plurality of pre-stored comment copywriting tags, setting a comment copywriting tag matching the content preference type as the comment copywriting tag of the user account.

In some embodiments, when the computer program is executed by the processor, the following acts are further implemented: obtaining comment preference corpus of the user account according to the preference information; performing a word segmentation process on the comment preference corpus to obtain a comment preference word of the user account; and determining the comment copywriting tag of the user account according to the comment preference word.

In some embodiments, when the computer program is executed by the processor, the following acts are further implemented: obtaining a user profile of the user account, in which the user profile includes at least one of an age, an identity and a geographic location; determining a content type of content to be commented; and in a plurality of pre-stored comment copywriting tags, setting a comment copywriting tag matching the content type and the user profile as the comment copywriting tag of the user account.

In some embodiments, when the computer program is executed by the processor, the following acts are further implemented: obtaining a current play progress of content to be commented; and in a plurality of pre-stored comment copywriting tags, setting a comment copywriting tag matching the current play progress as the comment copywriting tag of the user account.

In some embodiments, when the computer program is executed by the processor, the following acts are implemented: in response to the comment releasing instruction from the user account, obtaining a comment information database for the user account based on comment copywriting in the comment database whose comment copywriting tags match the comment copywriting tag of the user account; and obtaining the target comment information from the comment information database of the user account.

In some embodiments, when the computer program is executed by the processor, the following acts are further implemented: obtaining comment information from the comment information database for the user account as a comment copywriting template; obtaining a target nickname identifier, in which the target nickname identifier includes a nickname identifier of the user account and/or a nickname identifier of a content releasing account, and the content releasing account is an account releasing content to be commented; and combining the target nickname identifier with the comment copywriting template to obtain the target comment information.

In some embodiments, when the computer program is executed by the processor, the following acts are further implemented: randomly selecting comment information from the comment information database for the user account to obtain the target comment information.

In some embodiments, when the computer program is executed by the processor, the following acts are further implemented: randomly selecting a first set of comment information from the comment information database of the user account as the target comment information; and if the comment releasing instruction is received from the user account again, randomly selecting a second set of comment information from the comment information database as the target comment information, in which the second set of comment information includes comment information different from the comment information of the first set of comment information.

In some embodiments, when the computer program is executed by the processor, the following acts are implemented: in response to the comment releasing instruction from the user account, sending a comment information obtaining request to a server to trigger selection and return of the target comment information corresponding to the comment copywriting tag from the comment database by the server.

In some embodiments, a computer-readable storage medium having a computer program stored thereon is provided. When the computer program is executed by the processor, the following acts are implemented: receiving a comment information obtaining request, in which the comment information obtaining request is generated by a client according to a comment releasing instruction from a user account; and in response to the comment information obtaining request, determining a comment copywriting tag of the user account, and obtaining target comment information corresponding to the comment copywriting tag from a comment database; and sending the target comment information to the client, so that the client releases the target comment information in a comment interface of the user account.

In some embodiments, when the computer program is executed by the processor, the following acts are further implemented: obtaining user behavior data of the user account, in which the user behavior data includes at least one of comment-related behavior data of the user account for different comments and content-related behavior data of the user account for different contents, the comment-related behavior data includes at least one of duration of the comment-related behavior, thumb up data and sub-comment viewing data, and the content-related behavior data includes at least one of duration of the content-related behavior, thumb up data and comment viewing data; and obtaining the preference information of the user account based on the user behavior data.

In some embodiments, when the computer program is executed by the processor, the following acts are further implemented: determining the content preference type of the user account according to the preference information; and in a plurality of pre-stored comment copywriting tags, setting a comment copywriting tag matching the content preference type as the comment copywriting tag of the user account.

In some embodiments, when the computer program is executed by the processor, the following acts are further implemented: obtaining comment preference corpus of the user account according to the preference information; performing a word segmentation process on the comment preference corpus to obtain a comment preference word of the user account; and determining the comment copywriting tag of the user account according to the comment preference word.

The technical features of the above embodiments may be combined arbitrarily. In order to make the description concise, not all possible combinations of the technical features in the above embodiments are described. However, as long as there is no contradiction in the combination of these technical features, it should be considered as within the scope of the specification.

The above-mentioned embodiments only express several implementation manners of the present application, and the description is relatively specific and detailed, but it should not be understood as a limitation on the scope of the invention patent. It should be pointed out that for those of ordinary skill in the art, without departing from the concept of the present application, several modifications and improvements can be made, and these all fall within the protection scope of this application. Therefore, the protection scope of the present disclosure is limited only by the appended claims.

What is claimed is:

1. A method for displaying comment information, applied to a client, comprising:
    obtaining the play progress of the target content;
    determining a comment copywriting tag of a user account based on a play progress of target content, by setting a comment copywriting tag matching the play progress in a plurality of pre-stored comment copywriting tags as the comment copywriting tag of the user account;
    in response to a comment releasing instruction from the user account, obtaining a comment information database based on the comment copywriting tag of the user account, and obtaining target comment information from the comment information database; and
    releasing the target comment information in a comment interface of the user account.

2. The method according to claim 1, wherein said determining the comment copywriting tag of the user account comprises:
    obtaining preference information of the user account, wherein the preference information comprises content preference information or comment preference information; and
    determining the comment copywriting tag of the user account based on the comment copywriting tag which matches the play progress of the target content and the preference information of the user account in a plurality of pre-stored comment copywriting tags.

3. The method according to claim 2, wherein said obtaining the preference information of the user account comprises:
    obtaining user behavior data of the user account;
    obtaining the preference information of the user account based on the user behavior data;
    wherein the user behavior data comprises comment-related behavior data or content-related behavior data;
    wherein the comment-related behavior data comprises duration of the comment-related behavior, thumb up data and sub-comment viewing data, or the content-related behavior data comprises duration of the content-related behavior, thumb up data or comment viewing data.

4. The method according to claim 2, wherein said determining the comment copywriting tag of the user account comprises:
    determining a content preference type of the user account based on the preference information; and
    determining the comment copywriting tag by matching the content preference type.

5. The method according to claim 2, wherein said determining the comment copywriting tag of the user account comprises:
- obtaining comment preference corpus of the user account based on the preference information;
- obtaining a comment preference word of the user account by segmenting words of the comment preference corpus; and
- determining the comment copywriting tag based on the comment preference word.

6. The method according to claim 1, wherein said determining the comment copywriting tag of the user account comprises:
- obtaining a user profile of the user account, wherein the user profile comprises an age, an identity or a geographic location;
- determining a content type of target content; and
- determining the comment copywriting tag by matching the content type and the user profile.

7. The method according to claim 1, wherein obtaining a comment information database based on the comment copywriting tag of the user account comprises:
- obtaining the comment information database based on selected comment copywriting in a comment database in response to the comment releasing instruction from the user account, wherein the comment copywriting tag of the selected comment copy writing matches the comment copywriting tag of the user account.

8. The method according to claim 7, wherein said obtaining the target comment information from the comment information database comprises:
- obtaining comment copywriting template from the comment information database;
- obtaining a target nickname identifier, wherein the target nickname identifier comprises a nickname identifier of the user account and/or a nickname identifier of a content releasing account; and
- obtaining the target comment information by combining the target nickname identifier with the comment copywriting template.

9. The method according to claim 1, wherein said obtaining the target comment information from the comment information database comprises:
- obtaining the target comment information by selecting comment information randomly from the comment information database.

10. The method according to claim 9, wherein said obtaining the target comment information by selecting the comment information randomly from the comment information database comprises:
- selecting a first comment set randomly from the comment information database as the target comment information; and
- updating the target comment information based on a second comment set, wherein the second comment set is selected randomly from the comment information database in response to receiving the comment releasing instruction from the user account again and is different from the first comment set.

11. The method according to claim 1, wherein, in response to the comment releasing instruction from the user account, obtaining the target comment information from the comment information database comprises:
- sending a comment obtaining request to a server for triggering the server to determine and send the target comment information.

12. A method for displaying comment information, applied to a server, comprising:
- receiving a comment information obtaining request, wherein the comment information obtaining request is generated by a client based on a comment releasing instruction from a user account; and
- in response to the comment information obtaining request, determining a comment copywriting tag of the user account by setting a comment copywriting tag matching a play progress of target content in a plurality of pre-stored comments copywriting tags, and obtaining a comment information database based on the comment copywriting tag of the user account; and obtaining comment information from the comment information database; and
- sending the target comment information to the client.

13. The method according to claim 12, wherein the determining the comment copywriting tag of the user account comprises:
- obtaining preference information of the user account, wherein the preference information comprises content preference information or comment preference information; and
- determining the comment copywriting tag of the user account based on a comment copywriting tag which matches the play progress of the target content and the preference information of the user account in the plurality of pre-stored comment copywriting tags.

14. The method according to claim 13, wherein said obtaining the preference information of the user account comprises:
- obtaining user behavior data of the user account; and
- obtaining the preference information of the user account based on the user behavior data;
- wherein the user behavior data comprises comment-related behavior data or content-related behavior data;
- wherein the comment-related behavior data comprises duration of the comment-related behavior, thumb up data and sub-comment viewing data, or the content-related behavior data comprises duration of the content-related behavior, thumb up data or comment viewing data.

15. The method according to claim 13, wherein said determining the comment copywriting tag of the user account based on the preference information comprises:
- determining a content preference type of the user account based on the preference information; and
- determining the comment copywriting tag by matching the content preference type.

16. The method according to claim 13, wherein said determining the comment copywriting tag of the user account comprises:
- obtaining comment preference corpus of the user account based on the preference information;
- obtaining a comment preference word of the user account by segmenting words of the comment preference corpus; and
- determining the comment copywriting tag based on the comment preference word.

17. A client, comprising a processor and a memory, wherein the memory is stored with a computer program that, when executed by the processor, the method for displaying comment information is implemented, the method comprising:
- determining a comment copywriting tag of a user account based on a play progress of target content by obtaining the play progress of the target content and setting a comment copywriting tag matching the play progress in a plurality of pre-stored comment copywriting tags as the comment copywriting tag of the user account;

in response to a comment releasing instruction from the user account, obtaining a comment information database of the user account based on the comment copywriting tag of the user account, and obtaining target comment information from the comment information database; and releasing the target comment information in a comment interface of the user account.

* * * * *